(12) United States Patent
Kasar et al.

(10) Patent No.: US 12,386,451 B2
(45) Date of Patent: Aug. 12, 2025

(54) TOUCH SENSITIVE INPUT SURFACE

(71) Applicant: Apple Inc., Cupertino, CA (US)

(72) Inventors: Darshan R. Kasar, Redwood City, CA (US); Javier Mendez, San Jose, CA (US); Nicholas C. Soldner, Los Altos, CA (US); Grant H. Mulliken, Los Gatos, CA (US)

(73) Assignee: APPLE, INC., Cupertino, CA (US)

( * ) Notice: Subject to any disclaimer, the term of this patent is extended or adjusted under 35 U.S.C. 154(b) by 0 days.

(21) Appl. No.: 18/450,386

(22) Filed: Aug. 15, 2023

(65) Prior Publication Data

US 2024/0094840 A1 Mar. 21, 2024

Related U.S. Application Data

(60) Provisional application No. 63/375,919, filed on Sep. 16, 2022.

(51) Int. Cl.
*G06F 3/041* (2006.01)
*G06F 3/01* (2006.01)
*G06F 3/0346* (2013.01)

(52) U.S. Cl.
CPC .......... *G06F 3/0414* (2013.01); *G06F 3/016* (2013.01); *G06F 3/0346* (2013.01); *G06F 2203/04102* (2013.01)

(58) Field of Classification Search
CPC ....... G06F 3/0414; G06F 3/016; G06F 3/0346
See application file for complete search history.

(56) References Cited

U.S. PATENT DOCUMENTS

| | | | |
|---|---|---|---|
| 10,896,545 B1 * | 1/2021 | Kin | G06F 3/0304 |
| 2015/0253574 A1 * | 9/2015 | Thurber | G02B 27/0172 |
| | | | 359/630 |
| 2017/0259167 A1 * | 9/2017 | Cook | A63F 13/212 |
| 2020/0093362 A1 * | 3/2020 | Jackson | A61B 3/022 |
| 2021/0089150 A1 * | 3/2021 | Wang | G06F 3/041 |

* cited by examiner

*Primary Examiner* — Kevin M Nguyen
(74) *Attorney, Agent, or Firm* — Dorsey & Whitney LLP

(57) ABSTRACT

In at least one example of the present disclosure, a head-mountable device includes a display, a frame at least partially surrounding the display, a facial interface attached to the frame, a cover disposed around the facial interface, and a touch sensitive surface incorporated into the cover to receive input from a user for the head-mountable device.

20 Claims, 6 Drawing Sheets

TOUCH SENSITIVE INPUT SURFACE

CROSS-REFERENCE TO RELATED APPLICATION(S)

This claims priority to U.S. Provisional Patent Application No. 63/375,919, filed 16 Sep. 2022, and entitled "Touch Sensitive Input Surface," the entire disclosure of which is hereby incorporated by reference.

FIELD

The described examples relate generally to head-mountable devices. More particularly, the present disclosure relates to light seals for head-mountable devices that include touch sensitive input surfaces.

BACKGROUND

Recent advances in portable computing have enabled head-mountable devices that provide augmented and virtual reality (AR/VR) experiences to users. Such head-mountable devices typically include various components such as a display, a viewing frame or housing, a lens, a battery, a motor, speakers, and other components. These components can operate together to provide an immersive user experience. Additionally, head-mountable-devices can include components that help provide a distraction-free setting by blocking or sealing off the outside environment (e.g., ambient light). One way this can be accomplished is through the use of a light seal that defines an enclosed "eye-box" between the display and the user's eyes.

Due to the immersive environment created by head-mountable devices, consumers are always seeking input devices with increased and improved functionality. However, the desire for increased functionality is often offset by a desire not to increase the size or weight of the head-mountable device.

SUMMARY

In at least one example of the present disclosure, a head-mountable device includes a display, a frame at least partially surrounding the display, a facial interface attached to the frame, a cover disposed around the facial interface, and a touch sensitive surface incorporated into the cover to receive input from a user for the head-mountable device.

In one example, the head-mountable device further includes a first distinct touch sensitive surface and a second distinct touch sensitive surface disposed on an outer surface of the cover. In one example, the head-mountable device further includes a strain gauge disposed in the frame and electrically connected to the touch sensitive surface. In one example, the touch sensitive surface of the head-mountable device includes a conductive fabric. In one example, the touch sensitive surface of the head-mountable device is disposed on an outer surface of the cover and includes a distinct perimeter and the head-mountable device includes an indicator to direct the user to the touch sensitive surface. In one example, wherein the indicator of the head-mountable device includes a projection that extends outward from the cover along a perimeter of the touch sensitive surface. In one example, the indicator of the head-mountable device includes a visual cue generated on the display. In one example, wherein the indicator includes a light emitting diode positioned on an inner surface of the cover to guide the user to the touch sensitive surface. 9. In one example, the indicator of the head-mountable device includes a haptic engine disposed in the cover to provide haptic feedback to the user to guide the user to the touch sensitive surface. In one example, the head-mountable device further includes a position sensor configured to detect a near touch of the touch sensitive surface and a processor disposed on the frame, the processor is configured to turn on the touch sensitive surface when the sensor detects the near touch. In one example, the position sensor of the head-mountable device includes a camera.

In at least one example of the present disclosure, a wearable electronic device, includes a display, a frame, a light blocking material attached to the frame, and an input sensor configured to detect an input on the light blocking material.

In one example, the input sensor of the wearable electronic device includes an accelerometer disposed within the frame. In one example, the input sensor of the wearable electronic device includes a first capacitance sensor disposed within the light blocking material and a second capacitance sensor disposed within the light blocking material adjacent to the first capacitance sensor. In one example, the input sensor of the wearable electronic device includes a strain gauge connected to fabric in the light blocking material. In one example, the input sensor of the wearable electronic device comprises a strain gauge disposed with in the frame to detect a deflection of the frame. In one example, the input sensor of the wearable electronic device includes a conductive fabric in a matrix shaped pattern.

In at least one example of the present disclosure, a cover that is removably attachable to a head-mountable display includes a body including an inner surface and an outer surface, a removable fastener attached to the body, and a touch sensitive surface disposed on the outer surface of the cover.

In one example, the touch sensitive surface of the cover includes a conductive fabric that forms a strain gauge. In one example, the inner surface of the cover comprises a first light emitting diode and a second light emitting diode that are positioned are to guide a user to the touch sensitive surface.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Detailed reference will now be made to representative embodiments illustrated in the accompanying drawings. The following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a head-mountable device. More particularly, the present embodiments relate to a light seal of a head-mountable device including manual touch sensitive input surfaces for a user donning the head-mountable device to provide commands to the head-mountable device. As used herein "conductive fabric" can refer to the material or fabric into/onto which conductive elements are incorporated, or can refer to the conductive elements themselves, separate from the material or fabric with which they are integrated. The conductive fabric can include a plurality of conductive fibers. The conductive fabric can act as sensors, input members, and electrical interconnects to enable sensors and other electronic components to interact with one another. A manual input sensor can be a physically activated input system that can be used to provide an indication to a processor of a user's intent.

The head-mountable device of the present disclosure includes a manual input sensor that utilizes a touch sensitive surface that receives user input, such as touch input. The touch sensitive surface can accomplish this while being unobtrusively integrated with the light seal. A head-mountable device with such touch sensitive surfaces adds another way for a user to provide input or commands to a head-mountable device and adding functionality without adding burdensome components or structures.

These and other embodiments are discussed below with reference to FIGS. 1A-8B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1A:
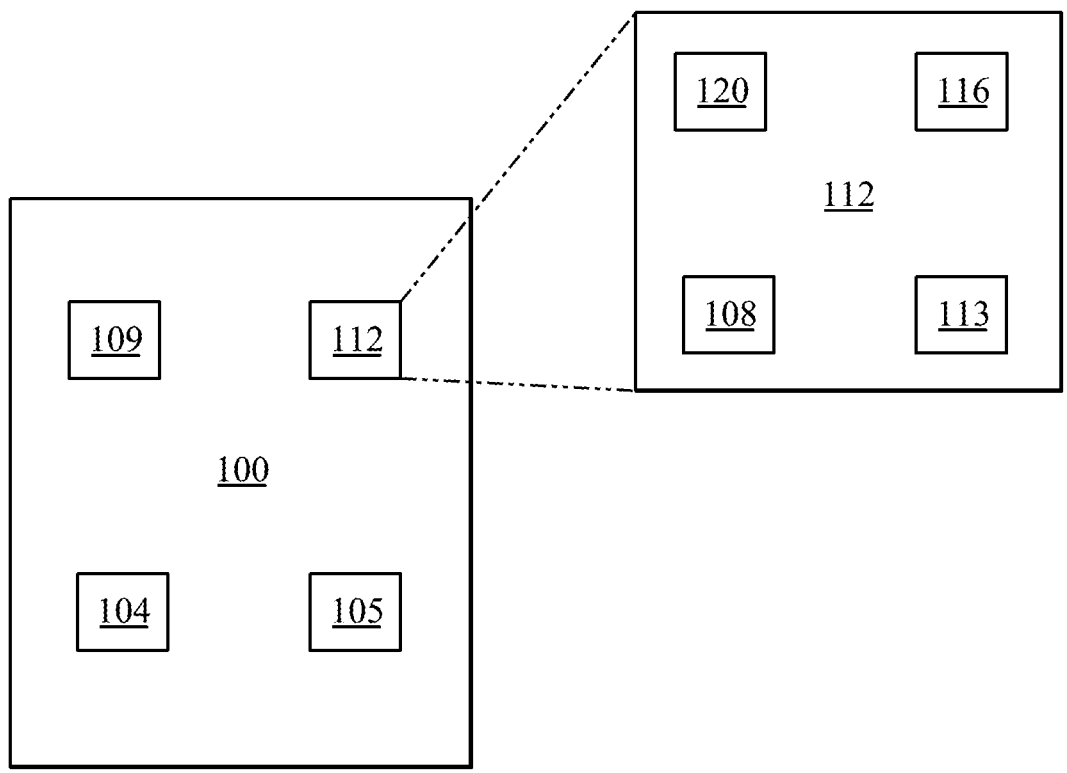
FIG. 1A shows a schematic block diagram of a head-mountable device, in accordance with some embodiments.

FIG. 1A illustrates a block diagram of a head-mountable device ("HMD") 100 including a frame 104, a display 105, a support (e.g., retention band 109), and a light seal or cover 112. The display 105 can include one or more optical lenses or display screens in front of the eyes of a user. The display 105 can include a display for presenting an augmented reality visualization, a virtual reality visualization, or other suitable visualization. Additionally, the frame 104 can at least partially surround the display 105. Similarly, the light seal 112 can be connected to the frame 104. In some examples, the light seal 112 includes the frame 104 (i.e., the frame 104 is part of the light seal 112).

The light seal 112 can include electrical components (e.g., sensors 120), a cover 113, a facial interface 108, and conductive fabric 116. The frame 104 can be a housing of the display 105. Further, the frame 104 can also be considered to be a part of or separate from the light seal 112. As used herein, the term "light seal" can refer to a portion of the HMD 100 that engages or shields a user's face. In particular, the light seal 112 includes portions (e.g., the facial interface) that conform to, contact, or press against regions of the user's face.

The light seal 112 includes a body with an inner surface and an outer surface. The outer surface is exposed to the external environment and the inner surface is disposed within the space formed by the HMD 100 and the user's face. The light seal can include a pliant (or semi-pliant) facetrack or face engagement component that spans the forehead, wraps around the eyes, contacts other regions of the face (e.g., zygoma and maxilla regions), and bridges the nose. In addition, the light seal 112 can include various components forming a frame, structure, or webbing of a head-mountable device disposed between the display 105 and the user's skin, such as the cover 113. The cover 113 can include a seal, environment seal, dust seal, air seal, etc. that is positioned between the gap between the display 105 and the user's face. The cover 113 can be a woven fabric that is non-rigid or deformable. The cover 113 can be elastically deformable. In some examples, the cover 113 can be a plastic, rubber, or polymer material. In some examples, the cover 113 can be rigid.

The cover 113 can form an eye-box through which the user can view the display 105. It will be appreciated that the term "seal" can include partial seals or inhibitors, in addition to complete seals (e.g., a partial light seal where come ambient light is blocked and a complete light seal where all ambient light is blocked when the HMD 100 is donned).

The light seal 112 can have a removable fastener that enables the light seal to be removably attachable to the frame 104 and in electrical communication with the display 105. The light seal 112 can include an electrical component, such as a sensor 120. The sensor 120 can collect user or environmental data, such as biometric information. The sensor 120 may receive input from the user, such as the user physically touching the sensor to input or command to the HMD 100 as an indication of the user's intent. The sensor 120 can transmit signals to the HMD, and more particularly to the display 105. The sensor 120 can transmit signals to an output configured to perform an action in response to the information collected by the sensor 120.

The light seal 112 can include conductive fabric 116. In some examples, the conductive fabric 116 can include highly elastic copper threads that can compress and stretch while still maintaining electrical connectivity. The conductive fabric 116 can be elastically deformable (i.e., capable of temporary change in length, volume, or shape). In some examples, the conductive fabric 116 can include electrically conductive carbon fibers. In some examples, the conductive fabric 116 can collect input from the user by the user engaging the conductive fabric through touch, such as with a finger or fingers. These movements can cause a change in the conductive fabric 116 (i.e., stretching or compressing). The degree or amount to which the conductive fabric 116 is moved by the user's finger can be detectable by the conductive fabric 116 and can be used to generate signals that can be analyzed by a processor of the HMD 100. As described in greater detail below, the conductive fabric 116 can be a thread, line, wire, plate, or any other structure that is capable of conducting electricity. The conductive fabric 116 can be integrated with the light seal 112. For example, the conductive fabric 116 can be embedded, interwoven, or encapsulated with the cover 113 or facial interface 108.

The display 105, being in electrical communication with the light seal 112, and more specifically with the conductive fabric 116, can receive electrical communication and provide feedback to the user related to the readings of the conductive fabric 116 (e.g. visual feedback, audio feedback, haptic feedback, etc.).

As used herein, the term "sensor" refers to one or more different sensing devices, such as a camera or imaging device, strain gauge, capacitance sensors, proximity sensors, touch sensitive sensors, accelerometers, and the like. Additional sensors can include a temperature sensor, oxygen sensor, movement sensor, brain activity sensor, sweat gland activity sensor, breathing activity sensor, muscle contraction sensor, etc. In some examples, the sensor can sense biometric features including features of the autonomic nervous system. Some examples of sensors include an electrooculography sensor, electrocardiogram sensor, EKG sensor, hear rate variability sensor, blood volume pulse sensor, SpO2 sensor, compact pressure sensor, electromyography sensor, core-body temperature sensor, galvanic skin sensor, accelerometer, gyroscope, magnetometer, inclinometer, barometer, infrared sensor, global positioning system sensor, etc. Additional sensor examples can include, contact microphones (e.g., press-based MEMS), bioelectrical activity sensors, UV exposure sensors, or particle sensors.

Any of the features, components, and/or parts, including the arrangements and configurations thereof shown in FIG. 1A can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1A.

Figure 1B:
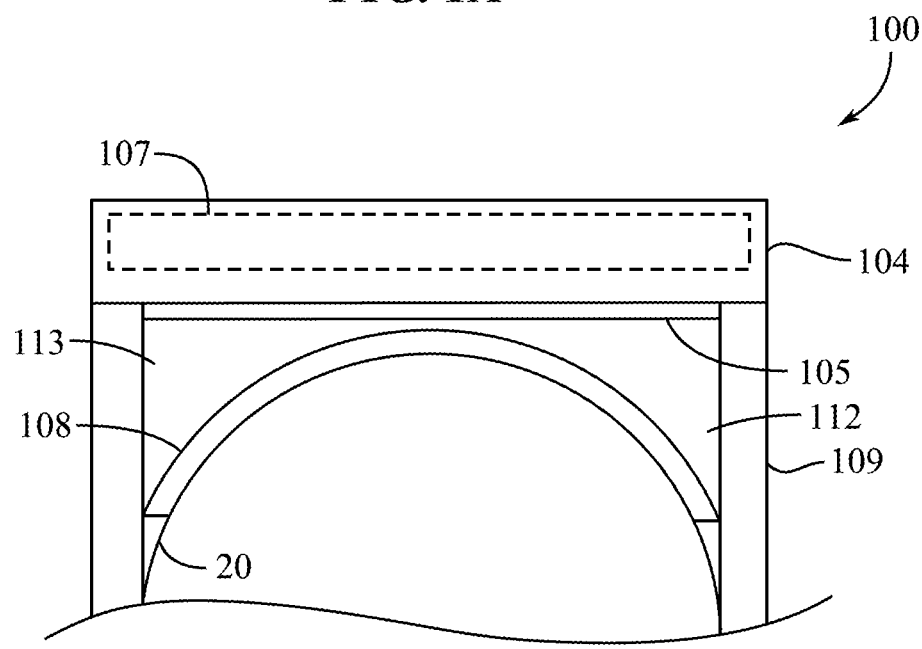
FIG. 1B shows a top view of a head-mountable device, in accordance with some embodiments.

FIG. 1B shows a top partial view of an HMD 100. The HMD 100 of FIG. 1B can be substantially similar to, including some or all of the features of, the HMD 100 described in FIG. 1A. The HMD 100 can include a display (also referred to as a display unit) 105. The display 105 can include any number of internal electronic components 107. The HMD 100 can include a frame 104 (which can also be referred to as a housing) attached to the display 105. In some examples, the display 105 includes an opaque, translucent, transparent, or semi-transparent screen, including any number lenses, for presenting visual data. The frame 104 can at least partially border one or more edges of the display 105. The frame 104 can be attached to a cover 113 at one end of the cover 113. At an opposite end, the cover 113 can form, or be attached to, a facial interface 108. In some examples, the frame 104, cover 113, and facial interface 108 together form the light seal 112. It will be understood, however, that the light seal 112 can include fewer or more components that those listed or shown.

The HMD 100 can be worn on a user's head 20 such that the display 105 is positioned over the user's face and disposed over one or both of the user's eyes. The HMD 100 can further include a retention band 109. The retention band 109 can secure the HMD 100 to the user's head during use so that they user can enjoy the experience provided by the HMD 100. The display 105 can be connected to the retention band 109 and/or the light seal 112. In some examples, the retention band 109 can be positioned against the side of a user's head 20 and in contact therewith. In some examples, the retention band 109 can be at least partially positioned above the user's ear or ears. In some examples, the retention band 109 can be positioned adjacent to the user's ear or ears. The retention band 109 can extend around the user's head 20. In this way, the display 105 and the retention band 109 can form a loop that can retain the HMD 100 on the user's head 20. It should be understood, however, that this configuration is just one example of how the components of the HMD 100 can be arranged, and that in some examples, a different number of connector straps and/or retention bands can be included. Although the HMD 100 is referred to as an HMD, it should be understood that the terms wearable device, wearable electronic device, head-mountable device, HMD, HMD device, and/or HMD system can be used to refer to any wearable device, including smart glasses.

In some examples, the frame 104 is attached to a facial interface 108. The facial interface 108 can contact a user's head 20 and/or face. In some examples, the cover 113 can be a light blocking component that extends between the frame 104 and the facial interface 108. The light blocking component can cover or surround a perimeter of the frame 104 and/or the facial interface 108.

The cover 113 can be a cloth, fabric, woven material, plastic, rubber, or any other suitable opaque or semi-opaque material. In some examples, the cover 113 is flexible, having the ability to repeatedly stretch, compress, and deform. The cover 113 can be elastically or in-elastically deformable. The facial interface 108 in combination with the cover 113 can block outside light and limits the peripheral view of the user. In some examples, the cover 113 and the facial interface 108 is the same or a unitary component. As will be discussed in greater detail below, the light seal 112 can include the conductive fabric 116 that is able to serve multiple functions and provide added benefits and functionality to the HMD 100.

Any of the features, components, and/or parts, including the arrangements and configurations thereof shown in FIG. 1B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1B.

Figure 2:
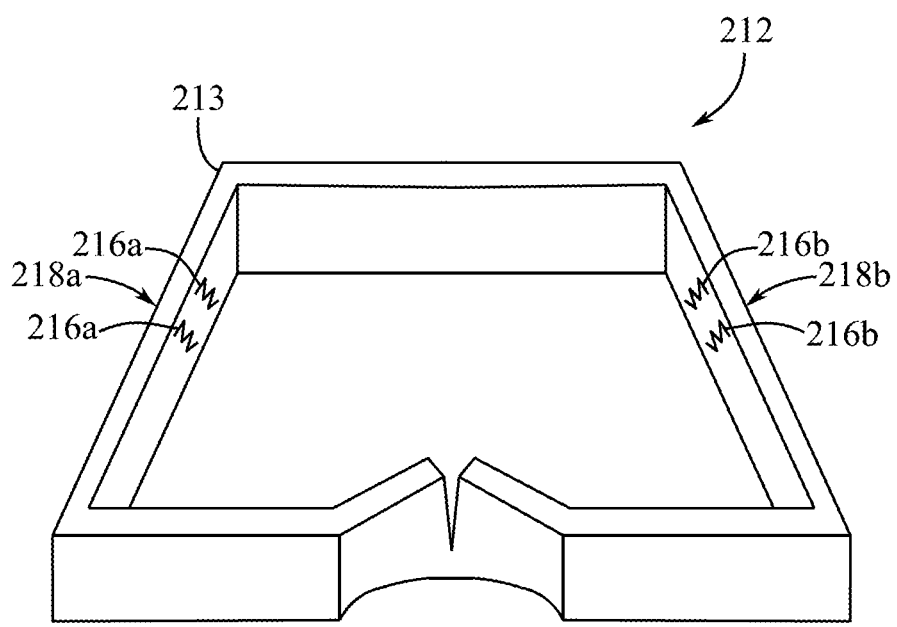
FIG. 2 shows a bottom perspective view of a light seal, in accordance with some embodiments.

FIG. 2 shows a bottom perspective view of select components of a light seal (e.g., 112). The light seal 112 can be substantially similar to, including some or all of the features of, the light seals described herein, such as light seal 112. The light seal 112 can be implemented on an HMD, such as HMD 100.

The light seal 112 can be integrated with conductive fabrics 216a, 216b (collectively referred to as conductive fabric 216). The conductive fabric 216 or thread can be positioned at various locations on the light seal 112. For example, the conductive fabric 216 can be positioned on or in the cover 213 (e.g., embedded, encapsulated, or interwoven into the cover).

In some examples, the conductive fabric 216 can be positioned on the facial interface 108 of the light seal (e.g., light seal 112). In one example, the conductive fabric 216 can be in direct contact with a user, for example, touching a user's forehead, cheek, nose, temple region, back of the head, or at any location where the HMD contacts the user. In some examples, the conductive fabrics 216 is disposed on an outer surface of the light seal 112.

In the illustrated example of FIG. 2, conductive fabrics 216a are disposed on a left side of the light seal and conductive fabrics 216b are disposed on a right side of the light seal 212. The conductive fabrics 216a can be disposed in a specific touch sensitive surface 218a and conductive fabrics 216b can be disposed in a touch sensitive surface 218b. The touch sensitive surfaces 218a, 218b can be manual input sensors to receive input from the user by manually or physically touching the touch sensitive surfaces 218a, 218b to provide input and/or commands to the HMD 100. However, the conductive fabric 216 can be located in a variety of different locations of the light seal 212.

Figure 3A:
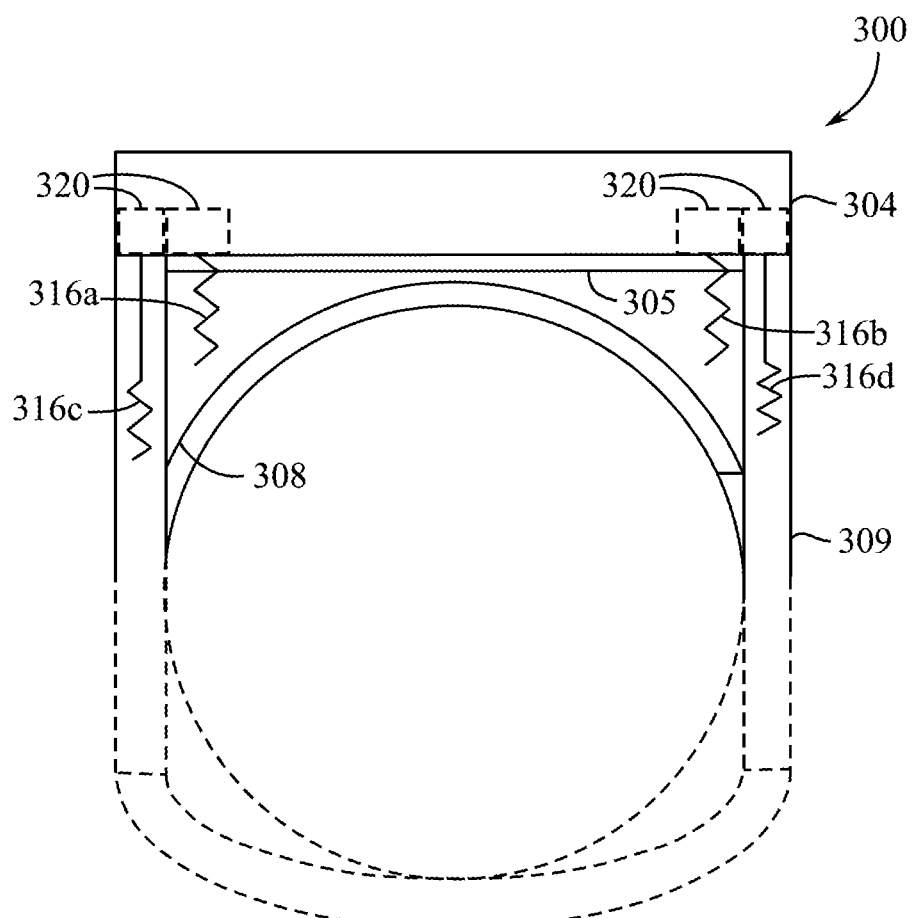
FIG. 3A shows a top view of a head-mountable device with conducive fabric in a light seal of the head-mountable device, in accordance with some embodiments.

FIG. 3A shows a top view of a head-mountable device ("HMD") 300. The HMD 300 can be substantially similar to, including some or all of the features of, the devices described herein, such as HMD 100 and light seal 212. In some examples, the HMD 300 can include an electronic component (e.g., sensor 320). The electronic component can be positioned on or housed in the display unit 305. The electronic component can be a battery, a processor, a display, a camera, or any other electronic component. In some examples the electronic module can be attached to the frame 304.

In some examples, the electronic component (e.g., a sensor 320) can be electrically connected by a conductive fabric 316a-d that runs through the cover (e.g., 113) of the light seal 312. In some examples, the conductive fabric 316a-d runs through or across a retention band 309. In some examples, the conductive fabric 316a runs through or across the frame 304. In this manner, the conductive fabric 316a-d serves as an interconnect (i.e., electrical connection) between the sensor 320 on the light seal 312. In some examples, the detections of the conductive fabrics 316a-d can be combined with other sensors on-board or remote from the HMD 300 to gather data is a sensor fusion manner. In the illustrated example, the light seal 312 include conductive fabrics 316a disposed on a left side of the light seal 312 and a conductive fabrics 316b disposed on a right side of the light seal 312. The conductive fabrics 316a can be disposed in a specific touch sensitive surface and conductive fabrics 316b can be disposed in a specific touch surface 318b. These specific touch sensitive surfaces, (e.g., 318b) are configured to allow a user to provide input to the HMD 100 by touching the specific touch sensitive surfaces, (e.g., 318b).

In the illustrated example, the light seal 312 includes two touch sensitive surfaces 318b, however, the present disclosure is not so limited and can include more or less than two touch sensitive surfaces. In some examples, the entire light seal 312 can be a touch sensitive surface that allows the user to input information or commands to the HMD 300 from any location on the light seal 312. In some examples, there can be a distinct number of touch sensitive surfaces to enable the user to input information or commands into the HMD 300. In some examples, each distinct touch sensitive surface can be directed to a specific type of input or functionality. For example, one touch sensitive surface can be for volume control, another touch sensitive input can be for scrolling, and the like. The HMD 300 can include an indicator that directs the user to the location of the distinct touch sensitive surfaces on the outer surface of the light seal 312.

In some examples, the HMD 300 can include a conductive fabric 316c, 316d incorporated onto and/or into the retention band 309 of the HMD 300. The retention band 309 can be a headband having flexible sections. The conductive fabric 316b can be configured to stretch or compress in response to the retention band 309 stretching or compressing. In some examples, the conductive fabric 316c, 316d can generate signals indicative of the tightness or position of the retention band 309. In some examples, a user can be notified based on the signals generated by the conductive fabric 316c, 316d. The retention band 309 can be automatically adjusted based on the signals generated by the conductive fabric 316c, 316d. In the illustrated example, the retention band 309 include conductive fabrics 316c disposed on a left side of the retention band 309 and a conductive fabrics 316d disposed on a right side of the retention band 309 and can be connected to electrical components 320 on the frame 304 of the HMD 300.

Figure 3B:
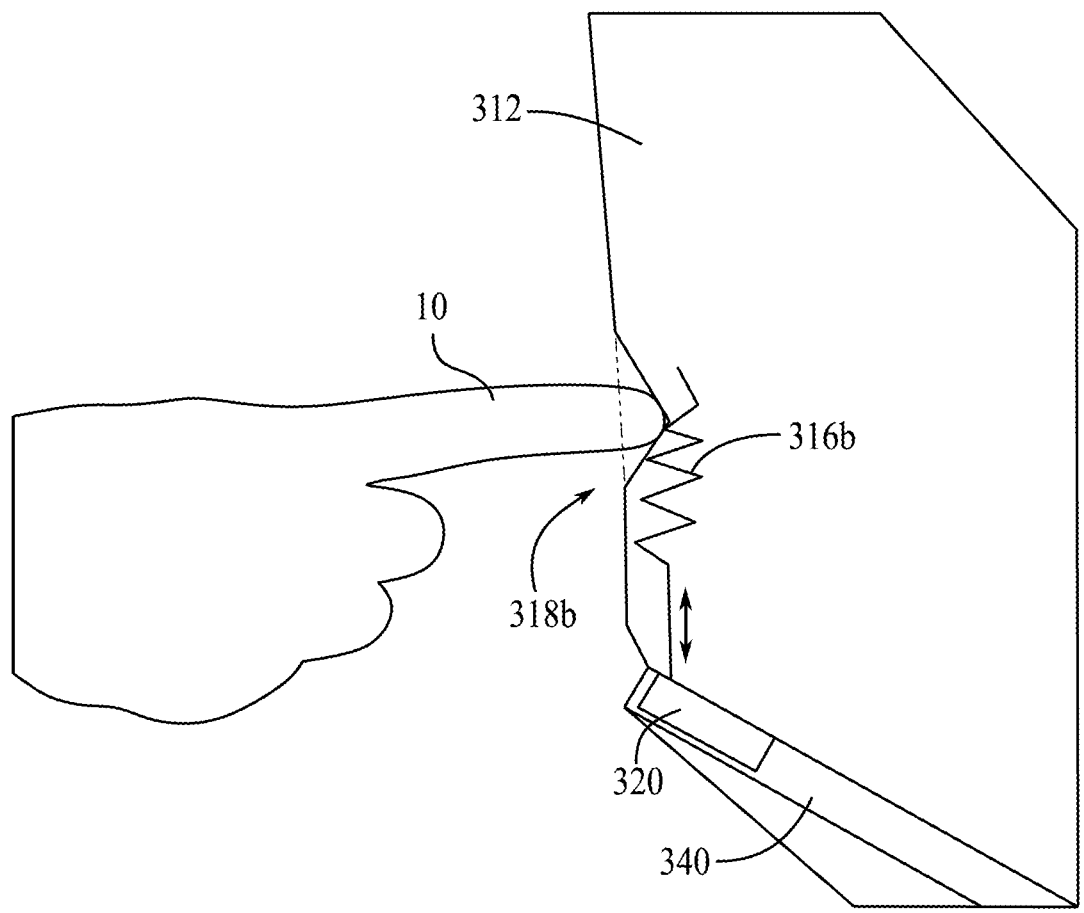
FIG. 3B shows a top view of a head-mountable device with a user engaging with a touch sensitive surface of a light seal of the head-mountable device, in accordance with some embodiments.

FIG. 3B illustrates a top view of a user interacting with the touch sensitive surface 318b. For case of illustration, the touch sensitive surface 318b depicts a single conductive fiber but can includes a plurality of conductive fibers. In some examples, the conductive fabric 316b is woven into a strain gauge pattern and the conductive fabric 316b is electrically connected to an electrical component (e.g., sensor 320) of the HMD 300. The user's engagement with the touch sensitive surface 318b can be interpreted as input to provide commands to the HMD 300.

In some examples, the conductive fabric 316b is physically connected to the sensor 320. The sensor 320 can be a strain gauge and the conductive fabric 316b is physically coupled to the strain gauge 320. The strain gauge 320 can measure the displacement of the conductive fabric 316b and interpret or transform the displacement of the conductive fabric 316b into input for the HMD 300.

In some examples, the touch sensitive surface 318b includes yarn that is physically connected to the strain gauge 320. All the yarn disposed within a perimeter of the touch sensitive surface 318b can be physically connected to the strain gauge 320. The touch sensitive surface 318b leverages the elastic nature of the yarn. In other words, as the user presses or touches the yarn of the touch sensitive surface 318b, the strain is transferred to the strain gauge 320 that is disposed away from the touch sensitive surface 318b and the strain gauge can measure the displacement of the yarn and interpreted the displacement as input for the HMD 300. In some examples, the touch sensitive surface 318 can include both conductive fabric 316b and yarn.

FIG. 3B illustrates the user pushing or poking the specific touch sensitive surface 318b with a finger 10, which displaces the conductive fabric 316b and transfers the displacement to the strain gauge 320, which interprets the displacement as a commend or input to the HMD 300. However, the user can use a number of different gestures with their finger 10 to provide input to the HMD 300. As discuss above, the user can press (e.g., poke) against the touch sensitive surface 318b. The user can also slide their finger 10 along the touch sensitive surface 318b. The user can stretch the touch sensitive surface 318b by using two fingers to stretch the conductive fabric 316b between the two fingers or push the conductive fabric 316b closer together. This gesture can be interpreted as zooming in or zooming out. The user can also pinch the conductive fabric 316a-d. This gesture can be interpreted as taking a picture. In some examples, the number of fingers used in the gesture can indicate a different type of input. For example, two fingers swiping can be interpreted by the system as a different input relative to a single finger swiping, or three fingers swiping.

The strain gauge 320 can be incorporated into the frame 304 of the HMD 300. In some examples, the strain gauge 320 can be disposed on the frame 304 of the HMD 300. In some examples, the strain gauge 320 can be disposed within the frame 304. For example, the frame 304 can includes a slot in which the strain gauge 320 is disposed and the yarn and/or conductive fabric 316b can enter to physically connect to the strain gauge 320. Accordingly, the strain gauge 320 is shielded from environmental conditions, such as sweat, fluid, debris, and the like.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
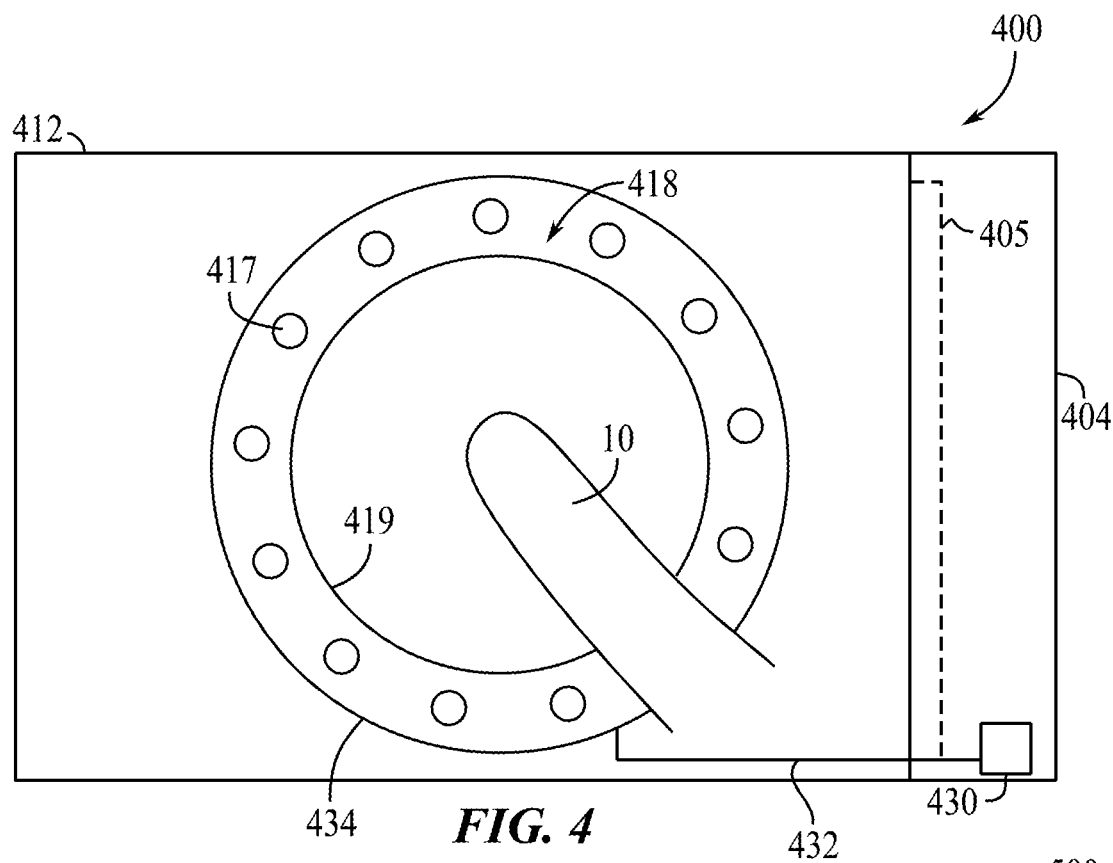
FIG. 4 shows a touch sensitive surface of a light seal of a head-mountable device, in accordance with some embodiments.

FIG. 4 illustrates a touch sensitive surface 418 on a light seal 412 of an HMD 400. The HMD 400 can be substantially similar to, including some or all of the features of, the devices described herein, such as HMD 100, 300 and light seal 212. The touch sensitive surface 418 can include a distinct perimeter 419. In the illustrated example, the perimeter 419 of the touch sensitive surface 418 is a circle, however, the perimeter 419 can include a plurality of different shapes. For example, the perimeter 419 can be semi-circular, ovoid, rectangular, trapezoidal, polygonal, triangular, and a variety of different shapes. As discuss above, the touch sensitive surface 418 can include a conductive fabric with conductive fibers (not shown) and/or yarn that can be connected to a strain gauge.

The touch sensitive surface 418 can include an indicator to alert or guide the user to the touch sensitive surface 418. For example, when the user is donning the HMD 400, the user cannot see the outer surface of the light seal 412 or the touch sensitive surface 418 on the light seal 412 as the HMD 400 is intentionally blocking their view outside of light seal 412 and HMD 400. Therefore, when the user is donning the HMD 400, the user attempts to engage with the touch sensitive surface 418 blindly. The indicator can provide feedback to help to user locate the touch sensitive surface 418 in a variety of different ways so that the user can input commands to the HMD 400 using the touch sensitive surface 418.

In the illustrated example of FIG. 4, the indicator can use tactile feedback to guide the finger 10 of the user to the touch sensitive surface 418. For example, a plurality of projections 417 or bumps can project outward from the surface of a light seal 412 along the perimeter 419 of the touch sensitive surface. Therefore, when the user slides their finger 10 over the projections 417, the user's feels a tactile sensation on the tip of their finger 10. These tactile sensations can orient and alert the user to the perimeter of the touch sensitive surface 418. In other words, as the finger 10 of the user approaches the touch sensitive surface 418 the projections 417 provide tactile feedback to the user to know that they have arrived at the touch sensitive surface 418. The projections 417 can be spaced along the perimeter 419 of the touch sensitive surface 418. The space between adjacent projections 417 may be less than the width a fingertip, so that user can feel it. In some examples, the projection 417 may be a continuous projection that extends along the entire perimeter 419 of the touch sensitive surface 418. In this manner, the user knows when they are approaching the perimeter 419 of the touch sensitive surface 418, either from the outside of the touch sensitive surface 418 or from the inside of the touch sensitive surface 418.

The projections 417 can have a variety of different shapes. In the illustrated example, the projections 417 have a circular shape. However, the scope of the present disclosure incorporates a variety of different shapes for the projections, such a rectangular, triangular, polygonal, and the like.

In some examples, the projections 417 can be positioned in patterns to help orient the user. For example, the bottom portion of the perimeter 419 can have a different pattern than the rest of the perimeter 419. For example, the bottom portion of the perimeter can have a cluster of three projections 419 that are closer to each other to indicate to the user that they are approaching the bottom portion of the perimeter 419 of the touch sensitive surface 418. Similarly, a top portion of the perimeter 419 can have a similar pattern as the bottom portion of a different pattern. The same goes for a left portion of the perimeter 419 and a right portion of the perimeter 419.

In some examples, the tactile feedback can be dynamic. In other words, in some examples the projections 417 can be felt, and in other examples the projections 417 cannot be felt. For example, in situations where the touch sensitive surface 418 is turned on and active, the projections 417 can be felt and in situations where the touch sensitive surface 418 is turned off and not active the projections 417 cannot be felt. In some examples, the projections 417 can be part of an inflatable bladder that inflates to make the projections 417 project outward from the outer surface of the light seal 412 and deflate to make the projections 417 retract back into the light seal 412. In some other examples, the projections 417 can be selectively activated by a solenoid or other electrically actuated system that extends the projections 417 outward from the outer surface of the light seal 412 when the touch sensitive surface 418 is active, and retracts the projections 417 when the touch sensitive surface 418 is not active. As discussed below in more detail, the touch sensitive surface 418 can become active when a position sensor detects a near touch. When a near touch is detected, the touch sensitive surface 418 can be turned on and the projections 417 can be activated and extended.

In other examples, the indicator can include visual feedback that alerts or guides the finger 10 of the user to the touch sensitive surface 418. Visual feedback can be displayed on a display 405 of the HMD 400 to the user. The HMD 400 can include a sensor, such as a camera, that is disposed on the frame 404 of the HMD 400. The sensor can capture images or video of the touch sensitive surface 418 on the outer surface of the light seal 412. Accordingly, the display 405 can display the images or video from the sensor directly to the user on the display 405 to show the user where their finger 10 is in relation to the touch sensitive surface 418 to help the user find and utilize the touch sensitive surface 418.

In another example, the display 405 can merely display animations or visual cues to the user to orient the finger 10 of the user toward the touch sensitive surface 418. For example, the display 405 can display to the user an animation, rather than a real-time video or image of how close the finger 10 of the user is relative to the touch sensitive surface 418. The animations or visual cues may be display in a corner on a peripheral of the display 405 so that the animations or visual cues are not overlap over the central area of the display 405.

In another example, an inner surface of the light seal 412 can include a plurality of light emitting diodes. The light emitting diodes can be used to provide feedback to the user to guide the user to the touch sensitive surface 418. In some examples, the light emitting diodes can outline the touch sensitive surface 418 on the inner surface of the light seal 412. When the light emitting diodes light up, the user can see the relative location of the touch sensitive surface 418, albeit, from the inside of the light seal 412. In some examples, the light emitting diodes on the inner surface of the light seal 412 may light up to show the user the current location of the finger 10 of the user from the inside of the light seal so that user can see the approximate location of their finger 10 relative to the touch sensitive surface 418.

In another example, the color of the light emitting diodes can change color based on the location of the finger 10 of the user relative to the location of the touch sensitive surface 418. For example, the light emitting diode can transition from a red color to a yellow color to a green color based on the location of the finger 10. The light emitting diode can be red when the finger 10 of is not near the touch sensitive surface 418, transition to a yellow color as the finger 10 get closer to the perimeter 419 of the touch sensitive surface 418 and turn green when the finger 10 engages the touch sensitive surface 418.

In some examples, the indicator can include haptic feedback. The light seal 412 can include a haptic engine 434 that is electrically connected to processor 430 via a wire 432. The haptic engine is configured to provide haptic feedback (e.g., vibration) to the user when their finger 10 approaches the perimeter 419 of the touch sensitive surface 418. The vibration of the haptic engine 434 can orient and alert the user to the perimeter 419 of the touch sensitive surface 418. In other words, as the finger 10 of the user approaches the touch sensitive surface 418 the haptic engine 434 vibrates to provide feedback to the user to know that they have arrived at the touch sensitive surface 418. In this manner, the user knows when they are approaching the perimeter 419 of the touch sensitive surface 418, either from the outside of the touch sensitive surface 418 or from the inside of the touch sensitive surface 418.

The processor 430 can also perform a variety of different functions, including communicating with each of the feedback mechanisms discussed above. The processor 430 can function as a triggering device that can turn on and turn off the touch sensitive surface. In an attempt to conserve power, the touch sensitive surface 418 can be turned on for a user to provide input to the HMD 400 and turned off when the touch sensitive surface 418 is not in use. The processor 430 can be in communication with a number of different sensors.

The processor 430 can be in communication with a position sensor that detects a near touch, which is when the finger 10 or hand of the user is within a predetermined distance of the touch sensitive surface 418. For example, the processor 430 can be in communication with a plurality of proximity sensors that are disposed around the perimeter 419 of touch sensitive surface 418 or disposed within the touch sensitive surface 418. The proximity sensor can detect a near touch. Accordingly, when the proximity sensor senses a near touch, the processor 430 triggers the touch sensitive surface 418 to turn on so that the user can engage with the touch sensitive surface 418. In other words, the processor 430 can turn on the touch sensitive surface 418 when the sensor detects a near touch.

In another example, the processor 430 can be in communication with a camera that captures images and/or video of the touch sensitive surface 418. The camera monitors the touch sensitive surface 418 on the outer surface of the light seal 412 and captures images and/or video of the touch sensitive surface 418. When the camera detects a near touch, the processor 430 determines that the user is about to touch the touch sensitive surface 418 and triggers the touch sensitive surface 418 to turn on so that the user can engage with the touch sensitive surface 418.

The HMD 400 can use a number of different position sensors, such as proximity sensors, cameras, capacitance sensors, or any other type of sensor to detect a near touch (e.g., the approach of the user's finger, hand, etc. to trigger turning on the touch sensitive surface 418). These systems can be used to avoid having environmental factors, such as fluid, water, humidity, sweat, accidently engaging with the touch sensitive surface 418 and triggering input to the HMD 400 when the user was not intending to.

Figure 5:
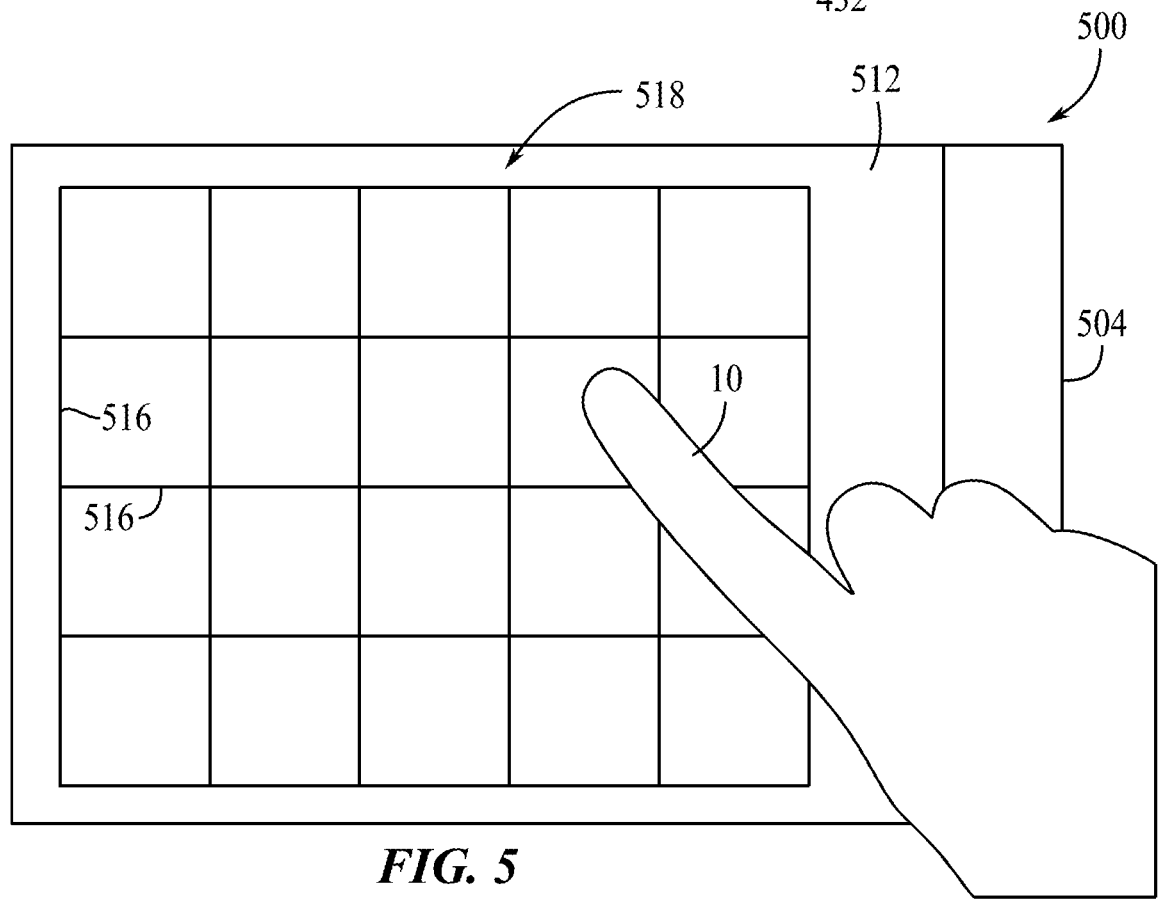
FIG. 5 shows a touch sensitive surface of a light seal of a head-mountable device, in accordance with some embodiments.

FIGS. 5-8B illustrate additional ways in which the user can provide input for the HMD in a variety of different manners. FIG. 5 illustrates an HMD 500 with a frame 504. The frame 504 of the HMD 500 is coupled to the light seal 512. The light seal 512 includes a touch sensitive surface 518 that is disposed on an outer surface of a light seal 512. In the illustrated example, the touch sensitive surface 518 can include a plurality of conductive fabrics 516 organize (e.g., weaved) in a specific pattern. In the illustrated example, the conduct fabric 516 is organized in a matrix pattern. When the conductive fabric 516 is organized in this pattern, the conductive fabric 516 can track the movement of the finger 10 along the touch sensitive surface 518. The conductive fabrics 516 can be spaced apart a predetermined distance such that environmental factors can not adversely affect input to the touch sensitive surface 518.

Figure 6:
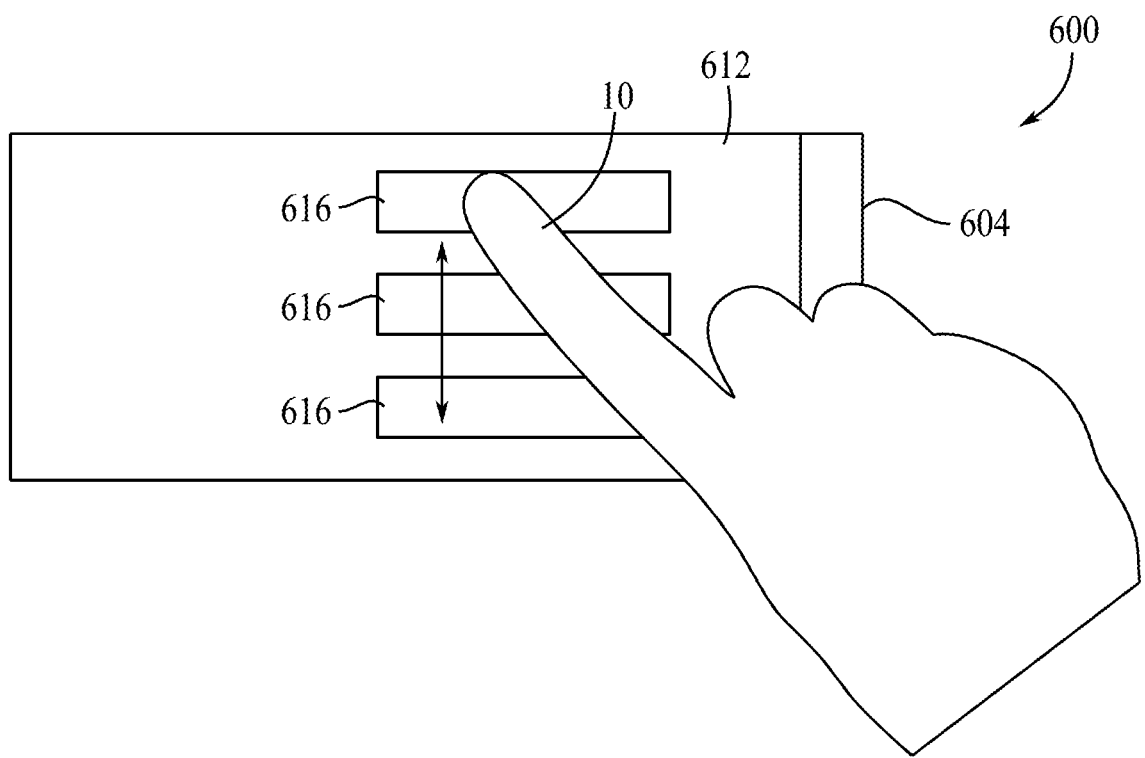
FIG. 6 shows a touch sensitive surface of a light seal of a head-mountable device, in accordance with some embodiments.

FIG. 6 illustrates an HMD 600 with a frame 604. The frame 604 of the HMD 600 is connected to the light seal 612. The light seal 612 includes a touch sensitive surface 618 that is disposed on an outer surface of a light seal 612. In the illustrated example, the touch sensitive surface 618 includes a plurality of planes 616 that are woven into the light seal 612 and are spaced vertically from each other. The planes 616 can get a capacitance reading to track the movement of the finger 10 of the user. In other words, the finger 10 can do a swiping motion or gesture in a vertical direction and the planes 616 can track the movement. This gesture can be used for volume control or scrolling. In some examples, the planes 616 can be spaced horizontally form each other and the user can do a swiping motion or gesture in a horizontal direction.

Figure 7:
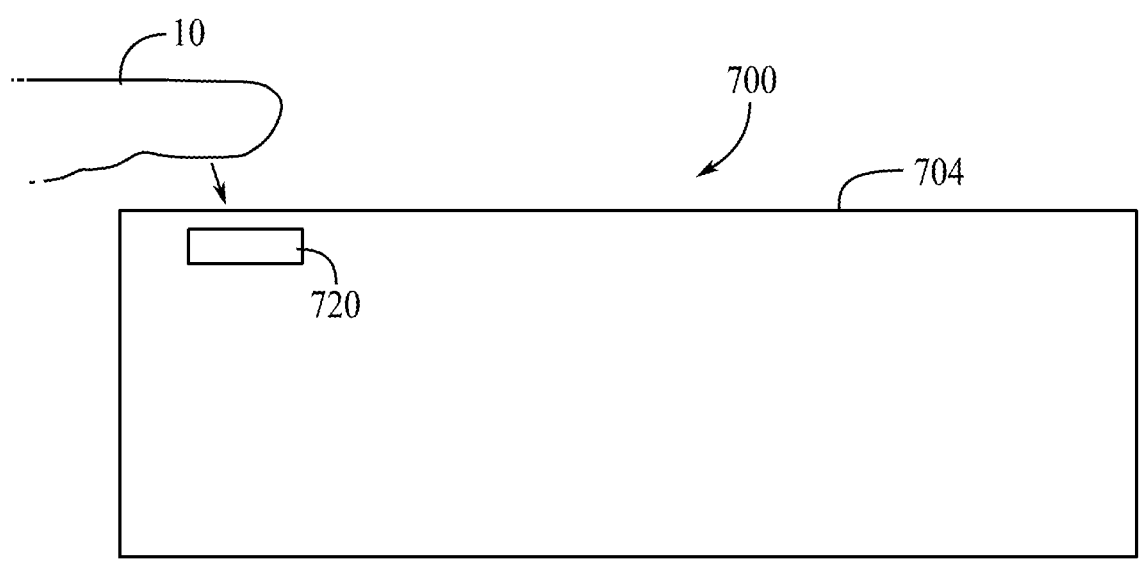
FIG. 7 shows a head-mountable device with a sensor incorporated with a frame of the head-mountable device, in accordance with some embodiments.

FIG. 7 illustrates an HMD 700 with a frame 704. The frame 704 can include a sensor 720. The sensor 720 can be an accelerometer that can detect vibrations in the frame 704. Accordingly, the user can tap the frame 704 of the HMD 700 with their finger 10. Tapping on the frame 704 can interpreted as input from the user to the HMD 700.

Figure 8A:
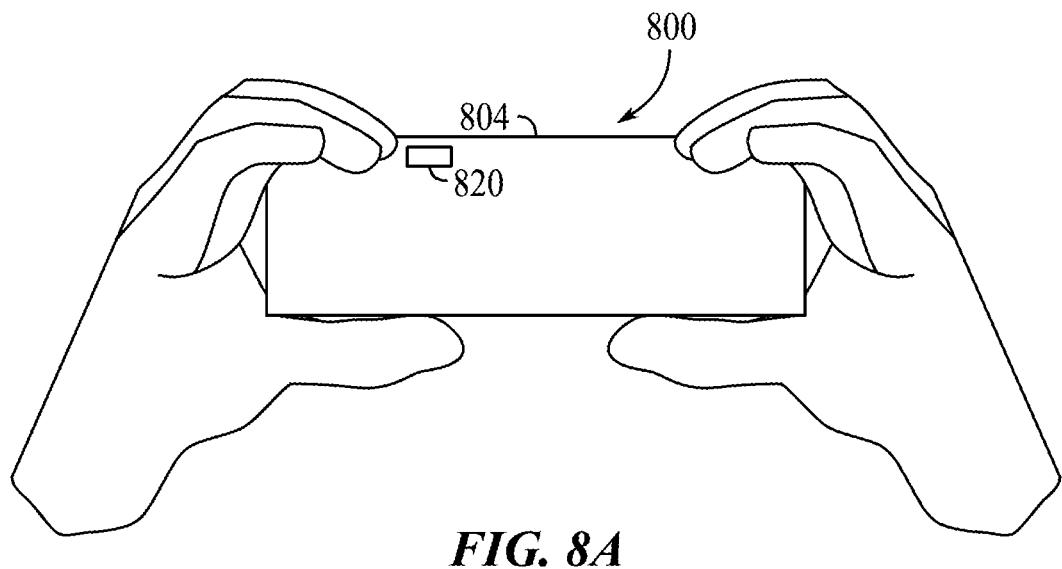
FIG. 8A shows a head-mountable device with a sensor incorporated with a frame of the head-mountable device, in accordance with some embodiments.
Figure 8B:
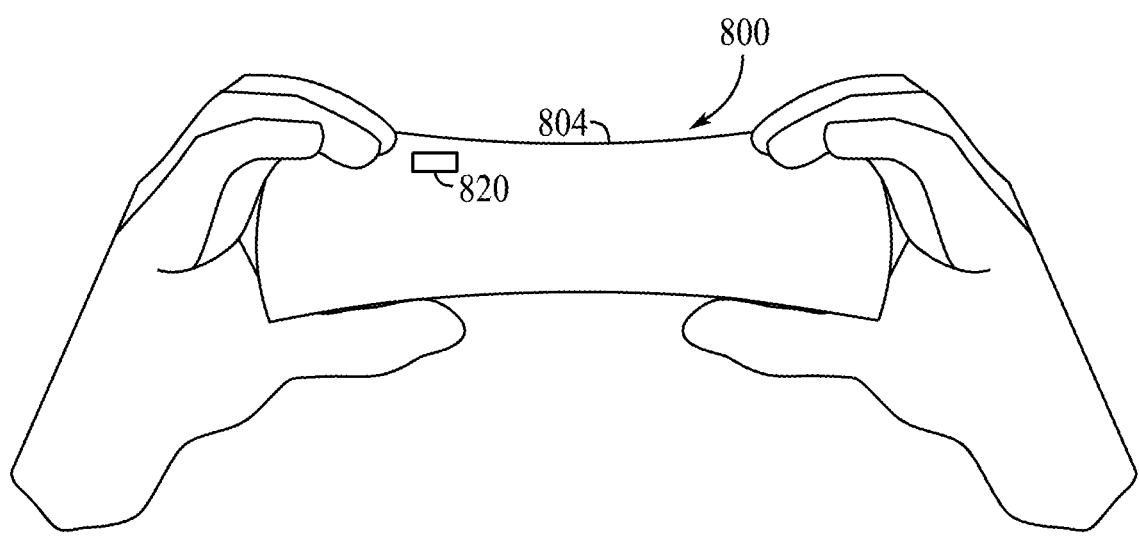
FIG. 8B shows the head-mountable device of FIG. 8A with a user mechanically deflecting the frame of the head-mountable device.

FIGS. 8A and 8B illustrate an HMD 800 with a frame 804. The frame 804 can include a sensor 820. The sensor 820 can be a strain gauge that can detect mechanical deflection of the frame 804. FIG. 8A illustrates the frame 804 in a natural or unconstrained state. FIG. 8B illustrates the frame 804 in constrained state in which the user is squeezing a top and a bottom of the frame 804 toward each other, thereby mechanically deflecting the frame 804. The deflection of the frame 804 can be interpreted as input to the HMD 800. For example, squeezing the HMD 800 as illustrated can be interpreted as a command to take a picture of the display of the HMD 800.

In some examples, the present system and method may collect, store, and/or use personal information data to adapt and/or improve the user experience. While not necessary to operate the present system and method, if such personal information is collected, stored, used, transmitted, or otherwise used, such use should be conducted according to well-established, generally accepted privacy policies and/or privacy practices.

The foregoing description, uses specific nomenclature to provide a thorough understanding of the described embodiments. However, the specific details are not necessary in order to practice the described examples. Therefore, the foregoing descriptions of the specific embodiments and examples are presented for purposes of illustration and description. They are not intended to be exhaustive or to limit the embodiments to the precise forms disclosed. Rather, many modifications and variations are possible in view of the above teachings.

What is claimed is:

1. A head-mountable device comprising:
a display;
a frame at least partially surrounding the display;
a retention support coupled to the frame;
a facial interface attached to the frame;
a cover disposed around the facial interface and configured to extend between the frame and a face of a user and contact the face, the cover comprising:
a first surface configured to contact the face of the user; and
a second surface extending from the first surface and configured to be exposed to an exterior environment when the user dons the head-mountable device; and
a touch sensitive surface incorporated into the second surface of the cover to receive input from the user for the head-mountable device.

2. The head-mountable device of claim 1, further comprising a first distinct touch sensitive surface and a second distinct touch sensitive surface disposed on an outer surface of the cover.

3. The head-mountable device of claim 1, further comprising a strain gauge disposed in the frame and electrically connected to the touch sensitive surface.

4. The head-mountable device of claim 3, wherein the touch sensitive surface comprises a conductive fabric.

5. The head-mountable device of claim 1, wherein:
the touch sensitive surface is disposed on an outer surface of the cover and includes a distinct perimeter; and
the head-mountable device comprises an indicator to direct the user to the touch sensitive surface.

6. The head-mountable device of claim 5, wherein the indicator comprises a projection that extends outward from the cover along a perimeter of the touch sensitive surface.

7. The head-mountable device of claim 5, wherein the indicator comprises a visual cue generated on the display.

8. The head-mountable device of claim 5, wherein the indicator comprises a light emitting diode positioned on an inner surface of the cover to guide the user to the touch sensitive surface.

9. The head-mountable device of claim 5, wherein the indicator comprises a haptic engine disposed in the cover to provide haptic feedback to the user to guide the user to the touch sensitive surface.

10. The head-mountable device of claim 1, further comprising a position sensor configured to detect a near touch of the touch sensitive surface; and
a processor disposed on the frame, the processor configured to turn on the touch sensitive surface when the sensor detects the near touch.

11. The head-mountable device of claim 10, wherein the position sensor comprises a camera.

12. A wearable electronic device, comprising:
a display;
a frame;
a light blocking material attached to the frame, the light blocking material comprising:
a first surface configured to contact a face of a user; and
a second surface extending from the first surface and configured to be exposed to an exterior environment when the user dons the wearable electronic device; and
an input sensor configured to detect an input on the second surface of the light blocking material.

13. The wearable electronic device of claim 12, wherein the input sensor comprises an accelerometer disposed within the frame.

14. The wearable electronic device of claim 12, wherein the input sensor comprises:
a first capacitance sensor disposed within the light blocking material; and
a second capacitance sensor disposed within the light blocking material adjacent to the first capacitance sensor.

15. The wearable electronic device of claim 12, wherein the input sensor comprises a strain gauge connected to fabric in the light blocking material.

16. The wearable electronic device of claim 12, wherein the input sensor comprises a strain gauge disposed with in the frame to detect a deflection of the frame.

17. The wearable electronic device of claim 12, wherein the input sensor comprises a conductive fabric in a matrix shaped pattern.

18. A cover removably attachable to a head-mountable display, the cover comprising:
a body including an inner surface configured to contact a face of a user and an outer surface configured to be exposed to an exterior environment when the user dons the head-mountable display;
a removable fastener attached to the body; and
a touch sensitive surface disposed on the outer surface of the cover.

19. The cover of claim 18, wherein the touch sensitive surface comprises a conductive fabric that forms a strain gauge.

20. The cover of claim 18, wherein the inner surface of the cover comprises a first light emitting diode, and a second light emitting diode;
wherein the first light emitting diode and the second light emitting diode are positioned to guide a user to the touch sensitive surface.

* * * * *